Jan. 12, 1932. A. MOORHOUSE 1,840,521
INTERNAL COMBUSTION ENGINE
Original Filed Oct. 7, 1925
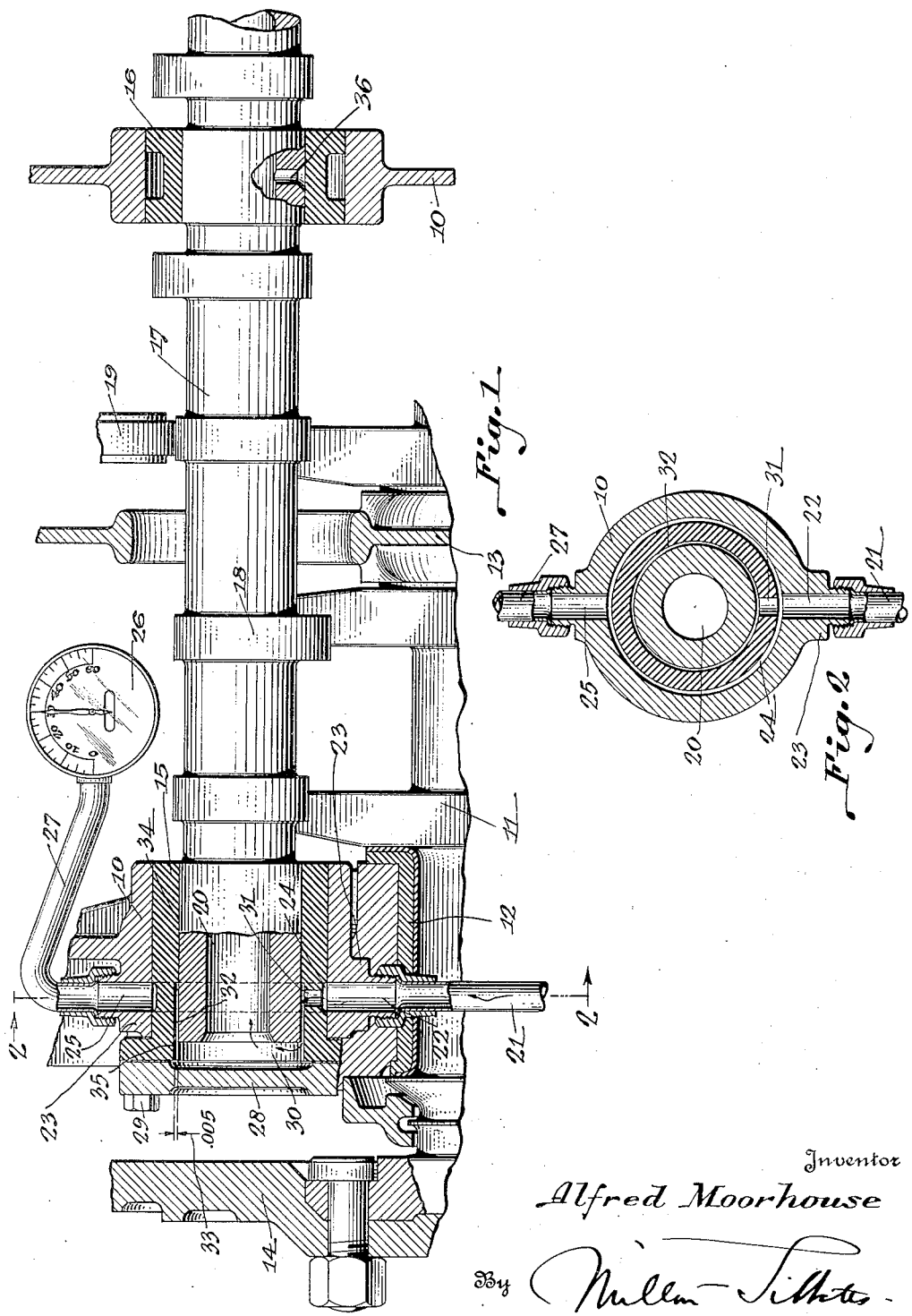
Inventor
Alfred Moorhouse
By
Attorney Patented Jan. 12, 1932

1,840,521

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed October 7, 1925, Serial No. 60,942. Renewed February 14, 1930.

This invention relates to internal combustion engines and particularly to lubrication means for engines.

The cam shaft of an internal combustion engine is usually fed with oil under pressure from the main oil circulation system, and this feed is usually metered or measured, or the passages to the cam shaft are so limited in size that the oil is fed in limited degrees to the cam shaft. The reason for this is that it is not desired to rob the main bearings of the engine of oil from the main feed line.

It has been found that this metering or restriction of oil flow to the cam shaft if obtained by small radial openings in the cam shaft registering with similar openings in the bearings, there is danger of the small openings being clogged with dirt, and there are also pulsations in the cam shaft due to the intermittent registering of the openings.

It is one of the objects of the present invention to provide a metered or limited feed of oil to the cam shaft through means that will provide a uniform and steady pressure in the cam shaft and keep it clear of dirt and other obstructions.

Other objects of the invention will appear from the following description taken in connection with the drawings, which form a part of this specification, and in which:

Fig. 1 is a longitudinal section through the cam shaft and associated parts of an internal combustion engine made in accordance with this invention, and Fig. 2 is a transverse section on the line 2—2 of Fig. 1.

Referring to the drawings, 10 represents fragmentary parts of the crank case of an engine in which is mounted a crank shaft 11 in suitable bearings 12 and 13. A fly wheel 14 is shown connected to the end of the crank shaft.

The section of Fig. 1 is a broken section, being through the bearings of both the cam shaft and the crank shaft which are not necessarily mounted one directly above the other. This arrangement, however, is well known in the art and it is believed that the drawing is clear in that particular.

One of the cam shaft bearings in the crank case is indicated at 15 and another and smaller bearing is indicated at 16. A cam shaft 17 is mounted in these bearings and is provided with the various cams 18 operating push rods 19 in the usual way. The cam shaft 17 is shown as hollow, being drilled out as at 20 to provide an oil passage therethrough.

The pipe line of the oil circulation system of the engine is indicated at 21, and this connects with a passage 22 formed in the boss 23 of the crank case 10 which surrounds the bearing 15. The bearing 15 is exteriorly formed with an annular groove 24 by which the oil is led around the bearing to an opposite passage 25 in the crank case 10 and this passage communicates with an oil gage 26 through a pipe 27. Thus the oil gage constantly indicates the pressure in the oil line 21.

The bearing 15 above referred to is closed at its end by a plate 28 suitably secured thereto as by one or more bolts 29 which preferably pass through the flange on the bearing 15 and into the boss 23 of the crank case so that the bearing 15 is also retained in place by this fastening.

By thus closing the end of the bearing 15, a housing is provided for the end of the cam shaft 17. Thus there is a chamber 30 formed at the end of the cam shaft in communication with the interior thereof, and it is through this chamber that oil is fed to the cam shaft so that it may reach the other bearings of the shaft such as the bearing 16.

For the purpose of feeding oil uniformly and in measured or limited quantities from the pipe line 21 to the cam shaft, a radial opening 31 is formed in the bearing 15 from the annular passage 24 to the interior of the bearing, and then there is provided an annular space 32 between the bearing and a portion of the cam shaft within the bearing. This space 32 entirely surrounds the end of the cam shaft and forms limiting means for the passage of oil from the passage 31 to the chamber 30. As shown, the space 32 is formed by making the bearing 15 in two diameters, and the difference in these diameters has in practice been found to be very satisfactory if made at about five thousandths of an inch. Thus the difference in the diameters is indicated as five thousandths as at 33. Thus the right hand end of the bearing 15 forms a real bearing for the cam shaft 17 as at 34, and the left hand end of the bearing 15, as indicated at 35, is reamed out slightly larger so that there is a clearance between the outer surface of the cam shaft 17 and the inner surface of the bearing at that point. This clearance 32 extends from that part of the bearing 15 in the zone of the passage 31 to the end of the cam shaft so that the oil will flow under pressure from the pipe 21 through the passages 22 and 31, through the clearance space 32 to the chamber 30 and thence into the interior 20 of the cam shaft 17. In the cam shaft the oil passes to the other bearings and suitable radial passages such as at 36 for the bearing 16 are provided to feed the oil to those bearings. Since the feed of oil to the chamber 30 from the pipe 21 is a constant feed, there is no pulsating of oil in the cam shaft. Also, it is a very easy matter to make the clearance 32 anything desired, within reasonable limits. If five thousandths clearance is satisfactory, it is very easy to ream out one end larger than the other, and if six thousandths is better, it is very easy to hold the diameters to very close limits and to make the difference six thousandths. In other words, the construction lends itself extremely well to accurate and rapid manufacturing processes.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In an internal combustion engine, the combination with the hollow shaft, of a bearing for one end of the shaft, a mounting for the bearing, a closure for one end of the bearing, means securing the closure, bearing and mounting together, the bearing having a double diameter bore and an exterior groove connected by a port to the bore of the larger diameter, means for feeding lubricant under pressure to the groove to distribute a limited quantity thereof through the port and larger bore to the bearing and open end of the shaft and to by-pass the remainder.

2. In an internal combustion engine, the combination with a hollow shaft, bearings for said shaft including an end bearing, the end bearing having an exterior groove connected by a port to a double diameter bore providing a restricted passage which serves to control the flow of lubricant to the end bearing and through the hollow shaft to the other bearings.

3. In an internal combustion engine, a hollow cam shaft open at one end, a bearing for the open end of the shaft having a greater clearance at one end than at the other, a chamber communicating with the open end of the shaft and with the end of the bearing having the greater clearance, and means for feeding lubricant under pressure through that portion of the bearing having the greater clearance.

4. In an internal combustion engine, a hollow, rotatable shaft of uniform cross section open at one end, a bearing for the shaft having a larger diameter at one end than at the other, a closure for the end of the bearing having the larger diameter, and means for feeding lubricant under pressure through that portion of the bearing having the larger diameter.

5. In an internal combustion engine, a hollow, rotatable shaft open at one end, a bearing for the shaft having a double diametral bore, the end of the bearing having the larger bore surrounding a portion of the shaft and extending beyond the open end thereof, a closure for the bearing providing a chamber communicating with the bore having the larger diameter and the open end of the shaft and means for feeding lubricant under pressure through that portion of the bearing having the greater diameter for distribution to the smaller bore and into the open end of the hollow shaft.

6. In an internal combustion engine, a hollow, rotatable shaft of uniform cross section open at one end, a bearing for the open end of the shaft having a double diametral bore providing a restricted passage adjacent to the open end of the shaft, means for closing the end of the bearing beyond the end of the shaft, and means for feeding lubricant under pressure to the larger bore for distribution to the smaller bore and into the open end of the hollow shaft.

In testimony whereof I affix my signature.

ALFRED MOORHOUSE.